US011503226B2

(12) United States Patent
Leppänen et al.

(10) Patent No.: US 11,503,226 B2
(45) Date of Patent: Nov. 15, 2022

(54) MULTI-CAMERA DEVICE (71) Applicant: NOKIA TECHNOLOGIES OY, Espoo (FI)

(72) Inventors: Jussi Leppänen, Tampere (FI); Arto Lehtiniemi, Lempäälä (FI); Sujeet Shyamsundar Mate, Tampere (FI); Antti Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 60 days.

(21) Appl. No.: 16/769,138

(22) PCT Filed: Dec. 13, 2018

(86) PCT No.: PCT/IB2018/060048
§ 371 (c)(1),
(2) Date: Jun. 2, 2020

(87) PCT Pub. No.: WO2019/123149
PCT Pub. Date: Jun. 27, 2019

(65) Prior Publication Data
US 2021/0227150 A1    Jul. 22, 2021

(30) Foreign Application Priority Data

Dec. 20, 2017 (EP) .................................. 17208720

(51) Int. Cl.
H04N 5/247 (2006.01)
H04N 5/262 (2006.01)
(Continued)

(52) U.S. Cl.
CPC .......... H04N 5/247 (2013.01); H04N 5/2624 (2013.01); H04N 5/2628 (2013.01); H04N 5/272 (2013.01);
(Continued)

(58) Field of Classification Search
CPC . H04N 5/272; H04N 21/6587; H04R 2499/11
(Continued)

(56) References Cited

U.S. PATENT DOCUMENTS

2011/0157327 A1   6/2011  Seshadri et al.
2017/0092329 A1   3/2017  Kim et al.
2017/0330365 A1*  11/2017 Adamov ............ H04N 21/6587

FOREIGN PATENT DOCUMENTS

CN    107211208 A    9/2017
EP    1 814 360 A2   8/2007
(Continued)

OTHER PUBLICATIONS

International Search Report and Written Opinion dated Feb. 15, 2019 corresponding to International Patent Application No. PCT/IB2018/060048.

(Continued)

Primary Examiner — Yosef K Laekemariam
(74) Attorney, Agent, or Firm — Squire Patton Boggs (US) LLP (57) ABSTRACT This specification describes: using a first camera of a multi-camera device to obtain first video data of a first region; using a second camera of the multi-camera device to obtain second video data of a second region; generating a multi-camera video output from the first and second video data using a first video mapping to map the first video data to a first portion of the multi-camera video output and using a second video mapping to map the second video data to a second portion of the multi-camera video output; and generating an audio output from obtained audio data, the audio output comprising an audio output having a directional component within the first portion of the video output and an audio output having a directional component within the second portion of the video output, wherein generating the audio output comprises using a first audio mapping to map (Continued)

audio data having a directional component within the first region to the audio output having a directional component within the first portion of the video output and using a second audio mapping to map audio data having a directional component within the second region to the audio output having a directional component within the second portion of the video output.

17 Claims, 9 Drawing Sheets

(51) Int. Cl.
  *H04N 5/272* (2006.01)
  *H04R 1/40* (2006.01)
  *H04R 3/00* (2006.01)
  *H04S 7/00* (2006.01)
(52) U.S. Cl.
  CPC .............. *H04R 1/406* (2013.01); *H04R 3/005* (2013.01); *H04S 7/30* (2013.01)
(58) Field of Classification Search
  USPC ...... 348/47, 48, 139, 153, 159, 218.1, 222.1
  See application file for complete search history.

(56) References Cited

FOREIGN PATENT DOCUMENTS

| EP | 2 551 763 A1 | 1/2013 | |
|---|---|---|---|
| EP | 2942936 | * 6/2014 | ........... G06F 3/0354 |
| EP | 2 942 936 A1 | 11/2015 | |

OTHER PUBLICATIONS

Notification of the First Office Action dated Jun. 3, 2021 corresponding to Chinese Patent Application No. 201880082485X, and English Summary thereof.
Summons to attend oral proceedings pursuant to Rule 115(1) EPC dated Mar. 1, 2021 corresponding to European Patent Application No. 17208720.7.
Second Office Action dated Feb. 17, 2022 corresponding to Chinese Patent Application No. 201880082485.X, with English summary thereof.

* cited by examiner

MULTI-CAMERA DEVICE

FIELD

The present specification relates to capturing video and audio content using a multi-camera device, such as a suitable mobile communication device.

BACKGROUND

Mobile communication devices including video cameras are known. Moreover, it is known to provide such cameras on both the front and rear of a mobile communication device. Content from the front and rear camera may then be presented next to each other. Such a presentation of visual data has implications for the presentation of some audio data relating to such visual data.

SUMMARY

In a first aspect, this specification describes a method comprising: using a first camera of a multi-camera device to obtain first video data of a first region; using a second camera of the multi-camera device to obtain second video data of a second region, the second camera being orientated in a different direction to the first camera, such that the first and second regions are at least partially different; generating a multi-camera video output from the first and second video data using a first video mapping to map the first video data to a first portion of the multi-camera video output and using a second video mapping to map the second video data to a second portion of the multi-camera video output; using the multi-camera device to obtain audio data, at least some of the audio data having a directional component; and generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively. The first and second portions of the multi-camera output may be presented side-by-side. The first and second portions of the multi-camera output may be presented with one data output on top of the other. The first camera may be a front camera. The second camera may be a rear camera.

The first and second video mappings may include modifying the first and second video data such that the first and second portions of the video output are narrower than the first and second video data.

Audio data having a directional component outside both the first and second regions may be excluded from the audio output. Alternatively, audio data having a directional component outside both the first and second regions may be included in the audio output as audio output without a directional component.

In a further alternative, audio data having a directional component outside both the first and second regions may be included in the audio output as audio output with a directional component, wherein the audio data having a directional component outside both the first and second regions undergoes a third audio mapping. The audio data having a directional component outside both the first and second regions may be stretched by the third audio mapping such that the area of the audio output corresponding to the area outside the first and second regions is wider than said area outside said first and second regions. Alternatively, or in addition, the first, second and third audio mappings may be such that the audio output provides a 360 degree audio output.

In some embodiments, using the multi-camera device to obtain the audio data may comprise using one or more spatial microphones or an array of microphones.

The method may further comprise a user indicating whether audio data associated with the first portion or the second portion of the multi-camera video output is to be boosted and/or attenuated. The user indication may be performed by a user contacting the first and/or the second portion of the multi-camera video output respectively.

In a second aspect, this specification describes an apparatus configured to perform any method as described with reference to the first aspect.

In a third aspect, this specification describes computer readable instructions which, when executed by computing apparatus, causes the computing apparatus to perform any method as described with reference to the first aspect.

In a fourth aspect, this specification describes a computer readable medium having computer-readable code stored thereon, the computer readable code, when executed by at least one processor, causing performance of: obtaining first video data of a first region using a first camera of a multi-camera device; obtaining second video data of a second region using a second camera of the multi-camera device, the second camera being orientated in a different direction to the first camera, such that the first and second regions are at least partially different; generating a multi-camera video output from the first and second video data using a first video mapping to map the first video data to a first portion of the multi-camera video output and using a second video mapping to map the second video data to a second portion of the multi-camera video output; obtaining audio data using the multi-camera device, at least some of the audio data having a directional component; and generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

In a fifth aspect, this specification describes an apparatus comprising: at least one processor; and at least one memory including computer program code which, when executed by the at least one processor, causes the apparatus to: use a first camera of a multi-camera device to obtain first video data of a first region; use a second camera of the multi-camera device to obtain second video data of a second region, the second camera being orientated in a different direction to the first camera, such that the first and second regions are at least partially different; generate a multi-camera video output from the first and second video data using a first video mapping to map the first video data to a first portion of the multi-camera video output and using a second video mapping to map the second video data to a second portion of the multi-camera video output; use the multi-camera device to obtain audio data, at least some of the audio data having a directional component; and generate an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

In a sixth aspect, this specification describes an apparatus comprising: means for obtaining first video data of a first region using a first camera of a multi-camera device; means for obtaining second video data of a second region using a second camera of the multi-camera device, the second camera being orientated in a different direction to the first camera, such that the first and second regions are at least partially different; means for generating a multi-camera video output from the first and second video data using a first video mapping to map the first video data to a first portion of the multi-camera video output and using a second video mapping to map the second video data to a second portion of the multi-camera video output; means for obtaining audio data using the multi-camera device, at least some of the audio data having a directional component; and means for generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively. The first and second portions of the multi-camera output may be presented side-by-side. The first and second portions of the multi-camera output may be presented with one data output on top of the other. The first camera may be a front camera. The second camera may be a rear camera. The means for obtaining audio data using the multi-camera device may comprise using one or more spatial microphones or an array of microphones.

The apparatus may comprise means for modifying the first and second video data to implement the first and second video mappings such that the first and second portions of the video output are narrower than the first and second video data.

Audio data having a directional component outside both the first and second regions may be excluded from the audio output. Alternatively, or in addition, audio data having a directional component outside both the first and second regions may be included in the audio output as audio output without a directional component.

In a further alternative, audio data having a directional component outside both the first and second regions may be included in the audio output as audio output with a directional component, wherein the audio data having a directional component outside both the first and second regions undergoes a third audio mapping.

The apparatus may comprise means for stretching the audio data having a directional component outside both the first and second regions by the third audio mapping such that the area of the audio output corresponding to the area outside the first and second regions is wider than said area outside said first and second regions.

The first, second and third audio mappings may be arranged such that the audio output provides a 360 degree audio output.

The apparatus may further comprise means for obtaining a user indication of whether audio data associated with the first portion or the second portion of the multi-camera video output is to be boosted and/or attenuated. The user indication may be performed by a user contacting the first and/or the second portion of the multi-camera video output respectively.

The said means may comprise: at least one processor; and at least one memory including computer program code, the at least one memory and the computer program configured, with the at least one processor, to cause the performance of the apparatus.

In a seventh aspect, this specification describes a computer-readable medium (such as a non-transitory computer readable medium) comprising program instructions stored thereon for performing at least the following: using a first camera of a multi-camera device to obtain first video data of a first region; using a second camera of the multi-camera device to obtain second video data of a second region, the second camera being orientated in a different direction to the first camera, such that the first and second regions are at least partially different; generating a multi-camera video output from the first and second video data using a first video mapping to map the first video data to a first portion of the multi-camera video output and using a second video mapping to map the second video data to a second portion of the multi-camera video output; using the multi-camera device to obtain audio data, at least some of the audio data having a directional component; and generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

BRIEF DESCRIPTION OF THE DRAWINGS

Example embodiments will now be described, by way of non-limiting examples, with reference to the following schematic drawings, in which.

DETAILED DESCRIPTION

Figure 1:
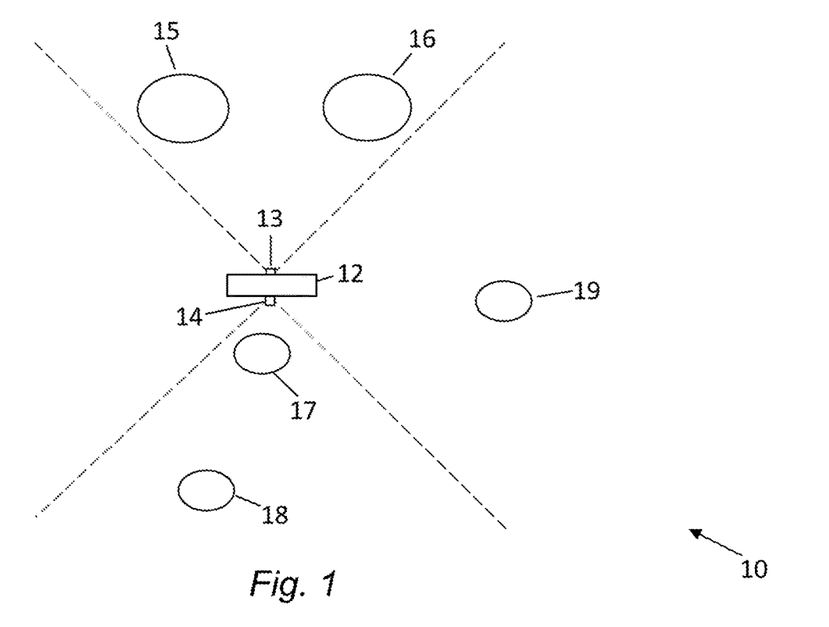
FIG. 1 is a block diagram of a system in accordance with an example embodiment.

FIG. 1 is a block diagram of a system, indicated generally by the reference numeral 10, in accordance with an example embodiment.

The system 10 comprises a user device 12, such as a mobile communication device (e.g. a mobile phone). The user device 12 has a front video camera 13 and a rear video camera 14. A first object 15 and a second object 16 are within a viewpoint of the front camera 13 (as indicated by dotted lines). A third object 17 and a fourth object 18 are within a viewpoint of the rear camera 14 (as indicated by dotted lines), with the fourth object behind at least partially obscured by the third object. The third object 17 may, for example, be the user of the user device 12. A fifth object 19 is to the right of the user device and is outside the field of view of both the front camera 13 and the rear camera 14.

The user device 12 is an example of a multi-camera device. Other multi-camera devices could be used in accordance with the principles described herein.

Figure 2:
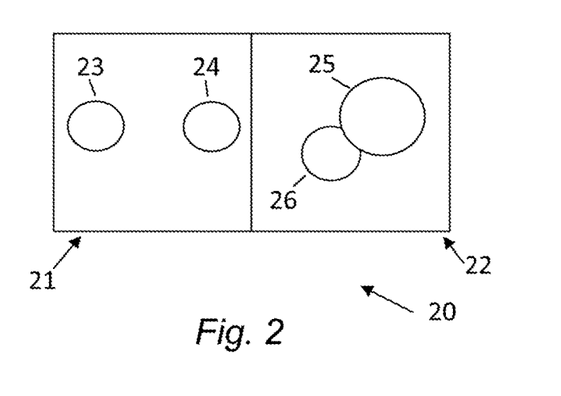
FIG. 2 shows an example view output by the system of FIG. 1.

FIG. 2 shows an example view, indicated general by the reference numeral 20, output by the user device 12 described above with reference to FIG. 1. The view 20 is a combined view that includes a first view 21 that is provided by the front camera 13 and a second view 22 that is provided by the rear camera 14. As shown in FIG. 2, the combined view 20 displays the first and second views side-by-side.

The first view 21 includes a first image 23 and a second image 24. The first image 23 (on the left of the view 21) is a representation of the first object 15. The second image 24 is a representation of the second object 16. In a similar way, the second view 22 includes a third image 25 that is a representation of the third object 17 and a fourth image 26 that is a representation of the fourth object 17. The fifth object 19 is not displayed.

Figure 3:
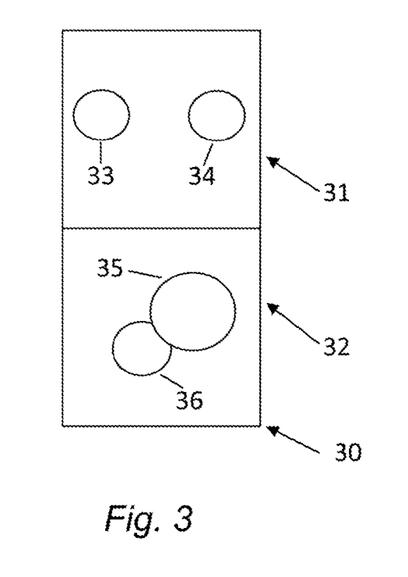
FIG. 3 shows an example view output by the system of FIG. 1.

FIG. 3 shows an example view, indicated generally by the reference numeral 30, output by the user device 12 described above with reference to FIG. 1. The view 30 is a combined view that includes a first view 31 that is provided by the front camera 13 and a second view 32 that is provided by the rear camera 14. The combined view 30 differs from the combined view 20 described above in that the first and second views are shown on top of one another in the combined view 30. As shown in FIG. 3, the first view 31 is displayed above the second view 32. In alternative embodiments, the second view could be displayed above the first view.

The first view 31 includes a first image 33 and a second image 34. The first image 33 (on the left of the view 31) is a representation of the first object 15. The second image 34 is a representation of the second object 16. In a similar way, the second view 32 includes a third image 35 that is a representation of the third object 17 and a fourth image 36 that is a representation of the fourth object 17. The fifth object 19 is not displayed.

Thus, the views 20 and 30 are similar, differing only in the arrangement of the first and second views that make up the views 20 and 30. (Whether or not the view 20 or 30 is used may depend on the orientation of the user device 12.)

Figure 4:
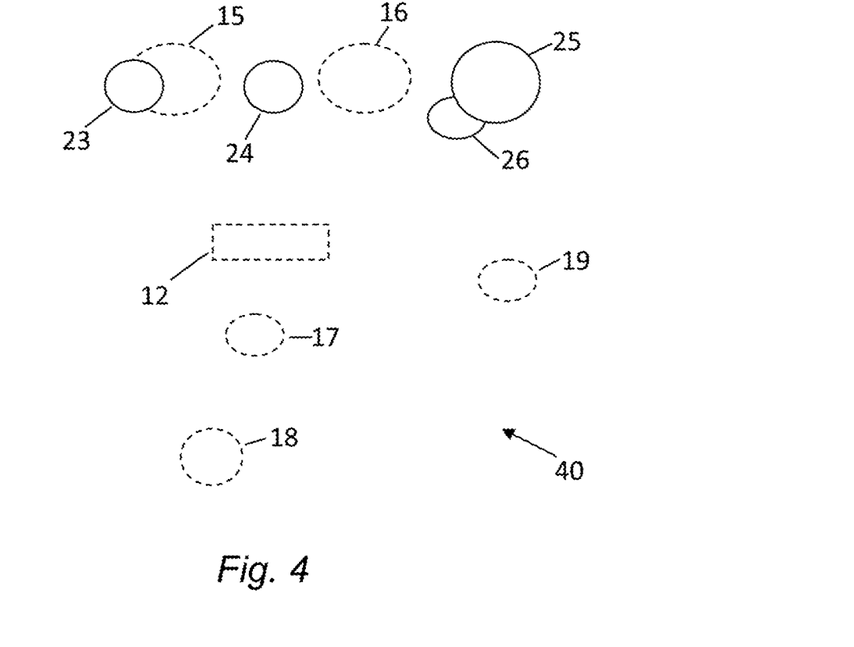
FIG. 4 is a block diagram of a system in accordance with an example embodiment.

FIG. 4 is a block diagram of a system, indicated generally by the reference numeral 40, in accordance with an example embodiment. The system 40 shows the elements of the system 10 described above (the user device 12 and the objects 15 to 19) in dotted lines. Also shown in the system 40 are the effective positions of the visual representations of those objects as shown in FIG. 2 (i.e. the images 23, 24, 25 and 26) shown in solid form.

As shown in FIG. 4, the visual representations 23 and 24 of the objects 15 and 16 are shifted to the left. Further, the visual representations 25 and 26 of the objects 17 and 18 are moved to in front of the user device (rather than behind).

As noted above, spatial audio techniques are known in which an array of microphones is used to capture a sound scene and subjected to parametric spatial audio processing so that, during rendering, sounds are presented so that sounds are heard as if coming from directions around the user that match video recordings. Such techniques are known, for example, in virtual reality or augmented reality applications. Such spatial audio processing may involve estimating the directional portion of the sound scene and the ambient portion of the sound scene.

The directional portion of the sound scene may comprise sound with an apparent direction of arrival (DOA), and may include direct sounds such as sounds of objects in the scene such as speakers, and also early reflections from the walls or the floor. The ambient of the sound scene may comprise sounds without apparent, strong directionality, such as diffuse reverberation. Analysis for the direction of arrival and the direct to ambient ratio may be performed at time-frequency tiles describing the spatial audio content at short temporal frames and at different frequencies (frequency bands). After analysing the directional portion and ambient portion of a spatial audio scene, the spatial audio scene can be represented in a suitable format such as two audio signals and metadata describing the direction of arrival and diffuseness for each time-frequency tile. In playback, the direct portion and ambient portion of the spatial audio scene may be synthesized (rendered). For example, the direct portion of the sound scene may be rendered and spatially positioned with vector-base-amplitude-panning (VBAP) such that it appears to emanate from the direction corresponding to the direction of arrival. The ambient portion may be rendered from all the directions, for example, all output channels, such that it appears to emanate from everywhere and not from any specific direction. Decorrelation filtering may be applied to the output signals of the ambient signal portion so that the coherence between channels is minimized and the output signal becomes enveloping (surrounding the listener). Instead of VBAP, head-related-transfer-function (HRTF) filtering may be used if a binaural output suitable for headphone listening is desired.

If the sound scene is represented in a parametric format as above, certain transformations can be applied. A typical example is rotating the sound directions of arrival depending on user head rotation such that the sound directions of arrival originate from fixed directions with regard to the world coordinates and do not rotate along with the user's head. In a similar manner, the direct sounds can be repositioned to a new direction of arrival by modifying the direction of arrival data to a new desired direction of arrival.

Instead of the above parametric spatial audio representation, spatial audio data could be represented as object-based data, where each sound object is represented as its own audio channel with position data. In this case, transforming the spatial audio data involves modifying the position data before rendering. The audio data could also comprise a combination of object-based data and channel bed data or ambisonics data. For example, the audio data could be in Moving Pictures Expert Group (MPEG)-H 3D audio format, or in any other suitable format which facilitates some transformations. If the spatial audio data is in a format which does not facilitate any transformations, then the device could apply analysis and/or parameterization to the audio data so that it can be converted to a format which enables transforming at least the directions of arrival of sound sources or their portions.

Spatial audio may also be presented to a user wearing headphones and receiving audio only. For example, with spatial audio, objects may sound louder the closer the user is to the audio and thus an improved user experience can be achieved with speakers only (i.e. without requiring the inclusion of video data).

Consider spatial audio recordings made by the user device 12 and presented in the system 40 shown in FIG. 4. If the audio is presented as a 3D sound scene, the sounds from the objects 15 to 19 will be heard as if coming from the locations shown in dotted lines in the system 40. Thus, there will be a mismatch between the visual views 23 to 25 and the corresponding audio.

Figure 5:
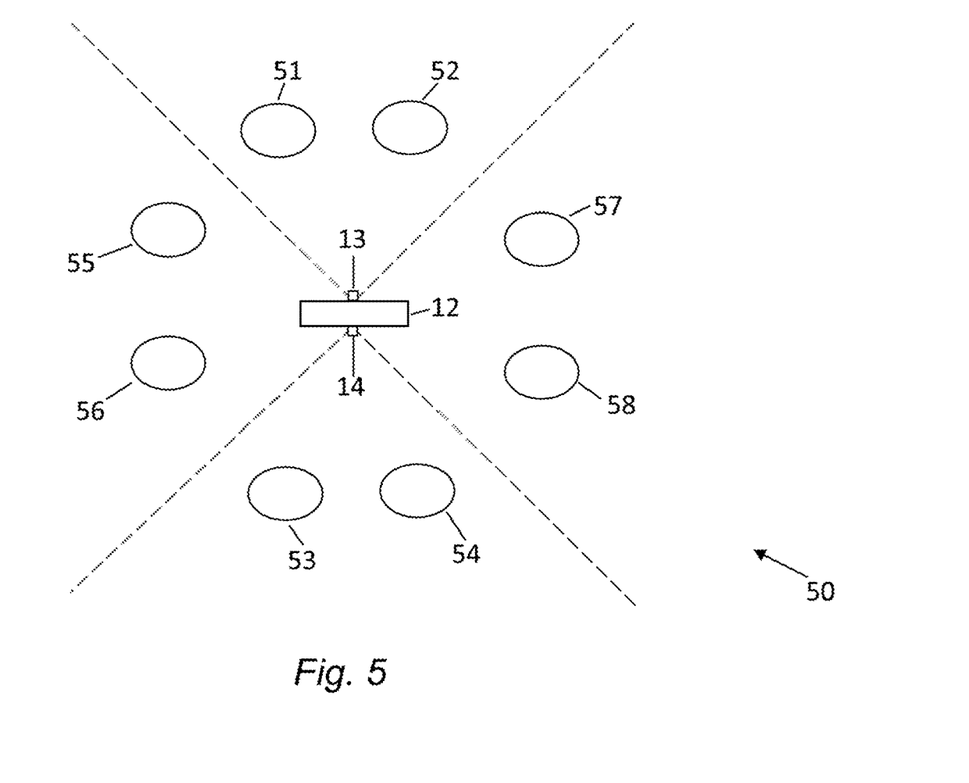
FIG. 5 is a block diagram of a system in accordance with an example embodiment.

FIG. 5 is a block diagram of a system, indicated generally by the reference numeral 50, in accordance with an example embodiment. The system includes the user device 12, first camera 13 and second camera 14 described above. The system 50 includes a first object 51 and a second object 52 within the field of view of the first camera 13 and a third object 53 and a fourth object 54 within the field of view of the second camera 14. The field of view of the first camera may be referred to as a first region, such that the first camera may be used to obtain data (e.g. video data) from the first region. Similarly, the field of view of the second camera may be referred to as a second region, such that the second camera may be used to obtain data (e.g. video data) from the second region.

As well as these visible objects, the system 50 also includes a fifth object 55, a sixth object 56, a seventh object 57 and an eighth object 58 that are not within the field of view of either camera of the user device. Of those, the fifth and sixth objects are to the left of the user device (as shown in FIG. 5) and the seventh and eighth objects are to the right of the user device (as shown in FIG. 5).

FIGS. 6 to 9 show data captured and output by the system 50 in accordance with various embodiments of the present invention.

Figure 6:
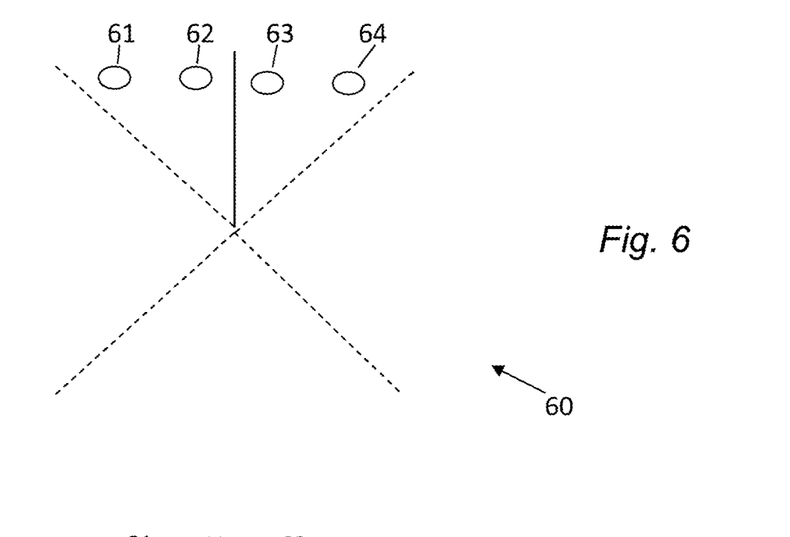
FIG. 6 shows data captured and output by the system of FIG. 5 in accordance with an example embodiment.

FIG. 6 shows data, indicated generally by the reference numeral 60, captured and output by the system 50 in accordance with an example embodiment. The data 60 includes first, second, third and fourth visual representations 61 to 64 (and accompanying spatial audio data) of the first, second, third and fourth objects 51 to 54 respectively. The visual representations 61 and 62 are shifted to the left and compressed/squeezed closer to cover a narrower area (as can be seen by comparing the positions of the representations 61 and 62 with the positions of the objects 51 and 52 shown in FIG. 5). Further, the visual representations 63 and 64 are moved to be next to the representations 61 and 62 (which can be viewed as being rotated by about 180 degrees). The representations 63 and 64 are also compressed/squeezed (as can be seen by comparing the positions of the representations 63 and 64 with the positions of the objects 53 and 54). Importantly, the spatial audio for the objects 51 to 54 is also required to be moved (and compressed/squeezed) by the same amounts so that the audio for the objects 51 to 54 appears to come from the same locations as the visual representations 61 to 64 respectively. Thus, the audio data undergoes a transformation corresponding to the transformation of the video data. In this way, the confusion described above as a result of a mismatch between audio and visual representations can be avoided. (The various transformations of the visual and audio representations may be referred to as video and audio mappings respectively.)

Figure 7:
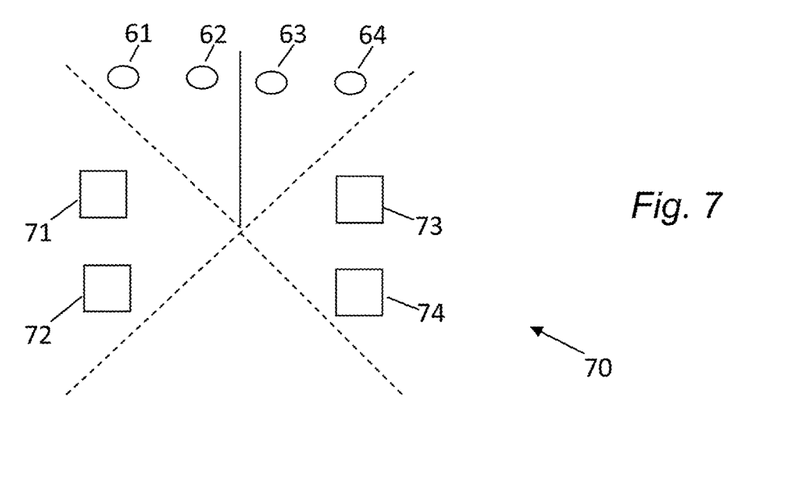
FIG. 7 shows data output by the system of FIG. 5 in accordance with an example embodiment.
Figure 8:
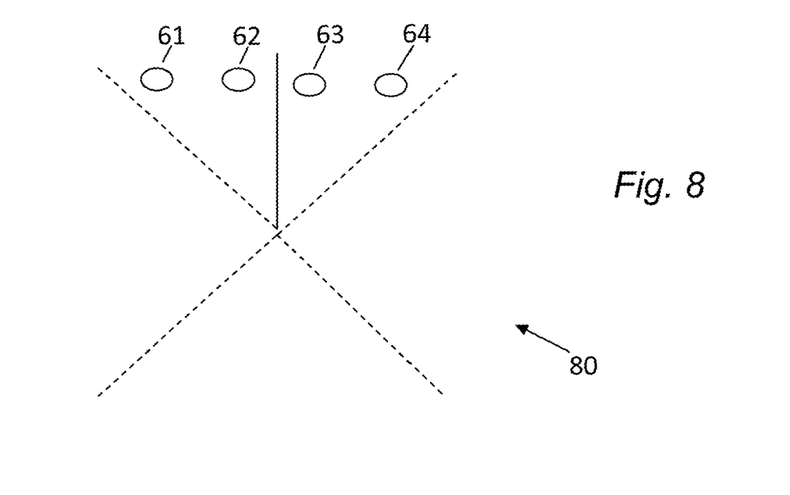
FIG. 8 shows data output by the system of FIG. 5 in accordance with an example embodiment.
Figure 9:
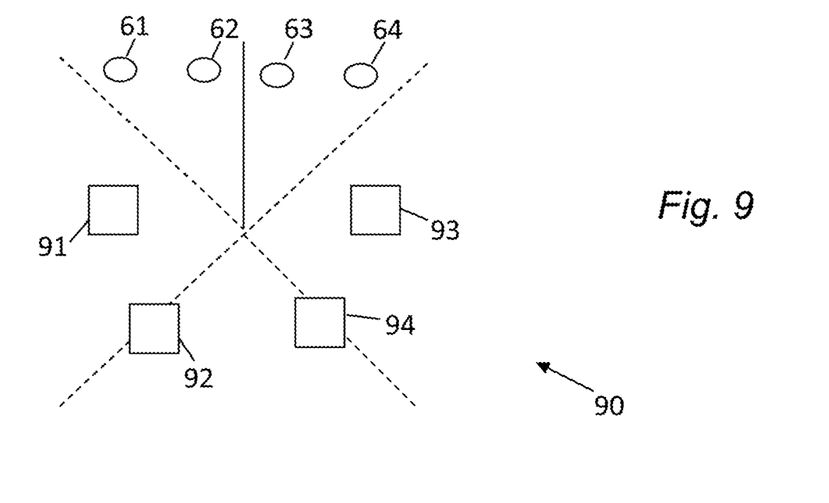
FIG. 9 shows data output by the system of FIG. 5 in accordance with an example embodiment.

In FIGS. 7 to 9, the video and audio data for the objects 51 to 54 (the representations 61 to 64) are identical to the representations in FIG. 6. FIGS. 7 to 9 also show different options for representing the audio data from the objects 55 to 58 that are not within the fields of view of the cameras 13 and 14, but for which spatial audio data may have been obtained.

FIG. 7 shows data, indicated generally by the reference numeral 70, output by the system 50 in accordance with an example embodiment. As noted above, the data 70 includes the video and audio representations 61 to 64 of the objects 51 to 54 respectively. FIG. 7 also shows first, second, third and fourth effective audio positions 71 to 74 for the fifth to eighth objects 55 to 58 respectively. (The audio representations 71 to 73 are indicated by squares to distinguish them from the video and audio representations 61 to 64.) As shown in FIG. 7, the representations 71 to 74 match the actual positions of the objects 55 to 58 respectively. Thus, no spatial data is represented as coming from the viewpoint of the rear camera 13.

FIG. 8 shows data, indicated generally by the reference numeral 80, output by the system 50 in accordance with an example embodiment. As noted above, the data 80 includes the video and audio representations 61 to 64 of the objects 51 to 54 respectively. FIG. 8 does not include audio data for the objects 51 to 54. Thus, in the example output 80, audio data from the objects 51 to 54 is either omitted entirely, or is not represented as directional spatial audio data (such audio data may, for example, be represented as ambient data, rather than directional spatial audio data).

FIG. 9 shows data, indicated generally by the reference numeral 90, output by the system of 50 in accordance with an example embodiment. As noted above, the data 90 includes the video and audio representations 61 to 64 of the objects 51 to 54 respectively. FIG. 9 also shows first, second, third and fourth effective audio positions 91 to 94 for the fifth to eighth objects 55 to 58 respectively. As shown in FIG. 9, the representations 91 to 94 are moved compared with actual positions of the objects 55 to 58 so that spatial audio data appears to come from all 360 degrees around the user. The moving of the representations 91 to 94 effectively stretches/fans-out the zones outside the fields of view of the cameras 13 and 14 and matches the compression of the representations 61 to 64 (i.e. the zone within the fields of view of the cameras). Thus, the spatial data 90 differs from the spatial data 70 described above in that audio data includes audio coming from the viewpoint of the rear camera 13.

Figure 10:
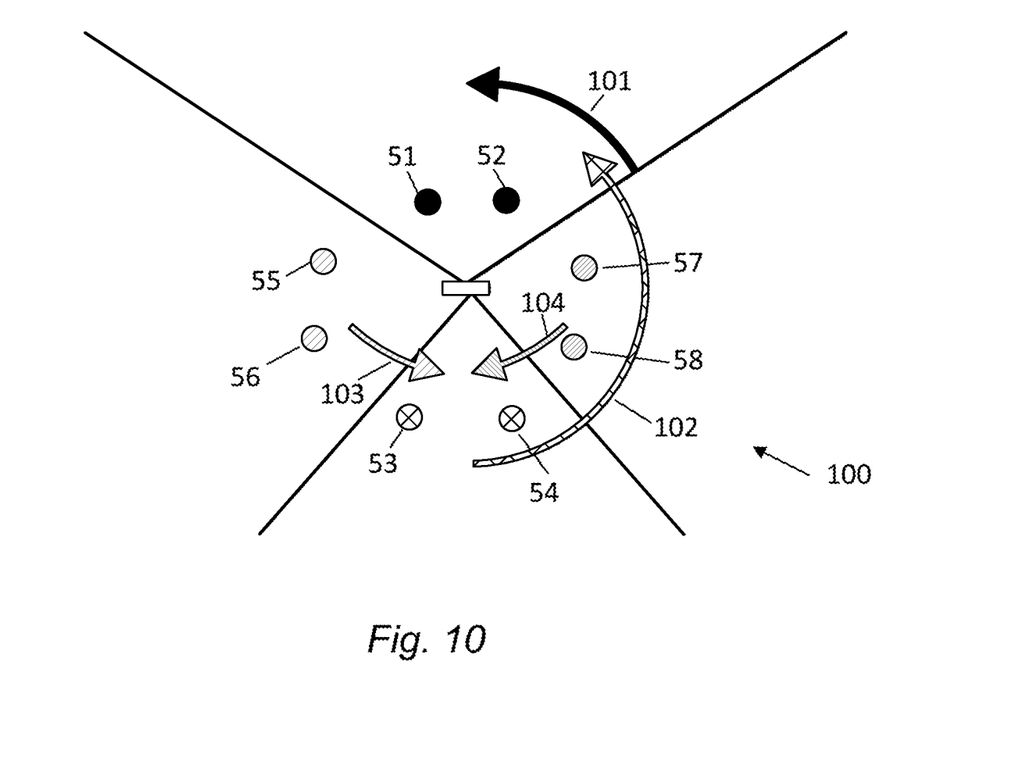
FIG. 10 shows data as manipulated in accordance with an example embodiment.

FIG. 10 shows data, indicated generally by the reference numeral 100, as manipulated in accordance with an example embodiment. Specifically, FIG. 10 shows how the captured video and audio data of the system 50 described above with reference to FIG. 5 is adjusted to provide the representation 90 described above with reference to FIG. 9.

FIG. 10 includes the first to eighth objects 51 to 58 described above with reference to FIG. 5. The first and second objects 51 and 52 are within the field of view of the first camera 13 of the user device 12. Video and audio data for the first and second objects are rotated anti-clockwise as indicated by the arrow 101 and are also compressed/squeezed, so that they appear in the positions indicated by the video and audio representations 61 and 62 shown in FIG. 9. (As described above, the zone in which the representations 61 and 62 appear is smaller than the zone in which the objects 51 and 52 are located.) Similarly, the third and fourth objects 53 and 54 are within the field of view of the second camera 14 of the user device. Video and audio data for the third and fourth objects are rotated anti-clockwise as indicated by the arrow 102 (and optionally reversed) and are also compressed, so that they appear in the positions indicated by the video and audio representations 63 and 64 shown in FIG. 9. Again, the zone in which the representations 63 and 64 appear is smaller than the zone in which the objects 53 and 54 are located.

The mapping indicated by the arrow 101 may be referred to as a first video and audio mapping. Similarly, the mapping indicated by the arrow 102 may be referred to as a second video and audio mapping.

The fifth and sixth objects 55 and 56 are outside the fields of view of the first and second cameras and so only audio data is captured for those objects. The spatial audio data for the fifth and sixth objects is rotated anti-clockwise as indicated by the arrow 103 and is also moved (or stretched/fanned-out), so that they appear in the positions indicated by the audio representations 91 and 92 shown in FIG. 9. (As described above, the zone in which the representations 91 and 92 appear is larger than the zone in which the objects 55 and 56 are located.) Similarly, the seventh and eighth objects 57 and 58 are outside the fields of view of the first and second cameras and so only audio data is captured for those objects. The spatial audio data for the seventh and eighth objects is rotated clockwise as indicated by the arrow 104 and is also moved (or stretched/fanned-out), so that they appear in the positions indicated by the audio representations 93 and 94 shown in FIG. 9. Again, the zone in which the representations 93 and 94 appear is larger than the zone in which the objects 57 and 58 are located.

The compressions as a result of the rotations 101 and 102 match the expansions as a result of the rotations 103 and 104, such that the audio output data provides 360 degree audio output. Thus, audio data can potentially be heard all around the user, which may give an adequate apparent 3-dimensional representation of the audio data in some circumstances. The mappings indicated by the arrow 103 and 104 may collectively be referred to as a third audio mapping.

Figure 11:
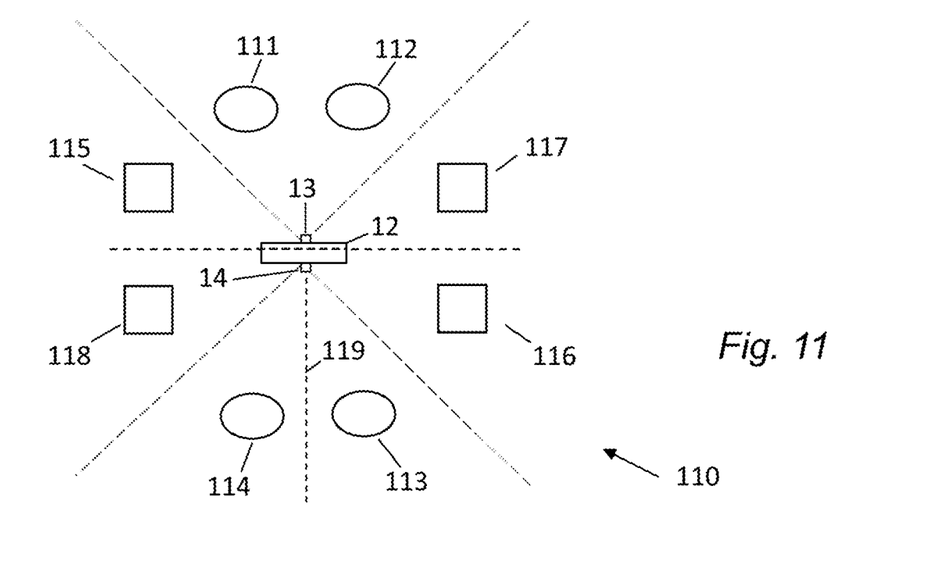
FIG. 11 shows data as manipulated in accordance with an example embodiment.
Figure 12:
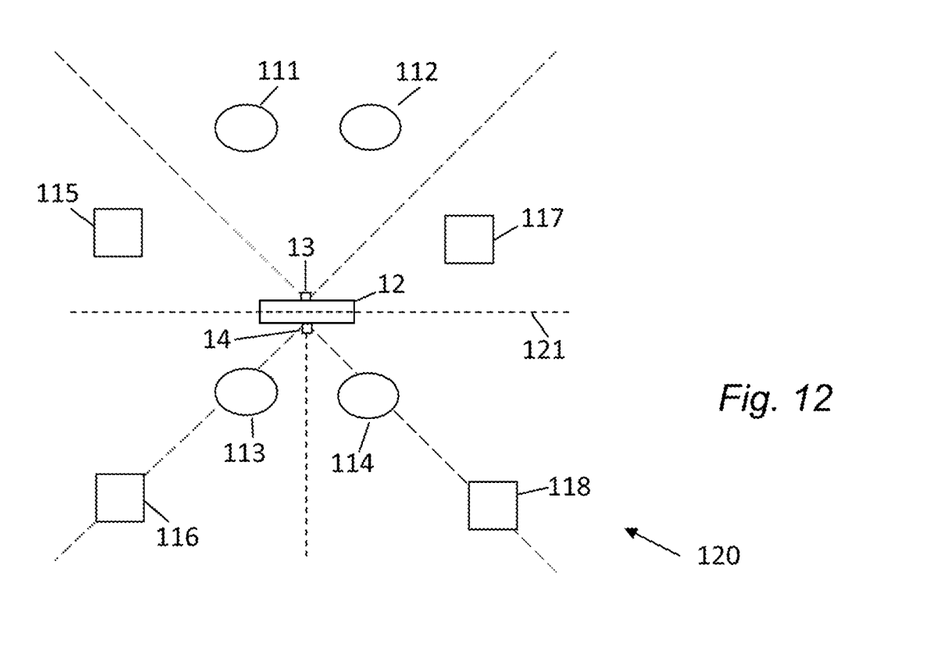
FIG. 12 shows data as manipulated in accordance with an example embodiment.
Figure 13:
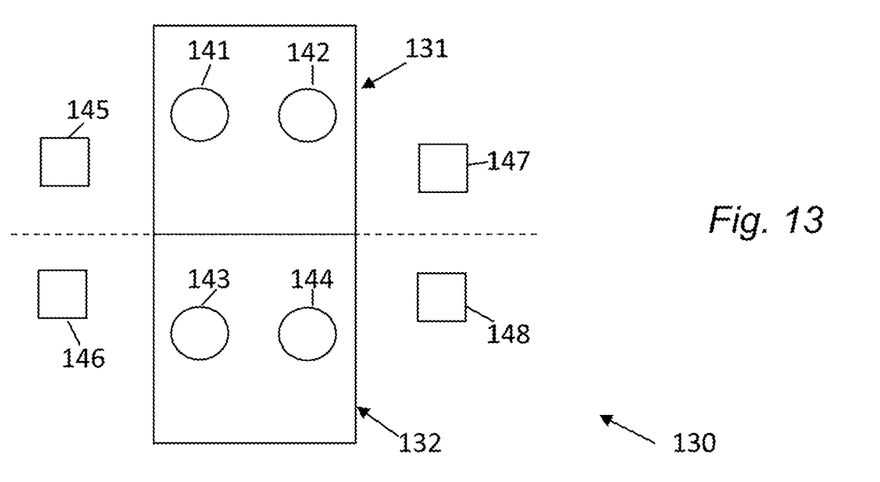
FIG. 13 shows data output by the system of FIG. 5 in accordance with an example embodiment.

As described above, FIGS. 6 to 10 describe arrangements by which video and audio data from the system 50 described above with reference to FIG. 5 can be provided in a side-by-side arrangement, such as the display 20 described above with reference to FIG. 2. FIGS. 11 to 13 describe arrangement by which video and data from the system 50 can be provided with one display on top of the other.

FIG. 11 shows data, indicated generally by the reference numeral 110, as manipulated in accordance with an example embodiment. The data 110 is based on the data of the system 50 described above. The data 110 includes first, second, third and fourth visual representations 111 to 114 (and accompanying spatial audio data) of the first, second, third and fourth objects 51 to 54 respectively. The data 110 also includes spatial audio representations 115 to 118 of the spatial audio data of the fifth to eighth objects 55 to 58 respectively that are outside the fields of view of the cameras 13 and 14.

The representations 111, 112, 115 and 117 are in the same positions as recorded (i.e. the same positions as the objects 51, 52, 55 and 57 respectively). The representations 113, 114, 116 and 118 (both visual and spatial audio data) are flipped so that they are a mirror image of the positions of the objects 53, 54, 56 and 58 (mirrored around a line 119 extending from the camera 14 downwards).

FIG. 12 shows data, indicated generally by the reference numeral 120, as manipulated in accordance with an example embodiment. The data 120 differs from the data 110 in that the representations 113, 114, 116 and 118 shown in FIG. 12 (data relating to the third, fourth, sixth and eighth objects 53, 54, 56 and 58, i.e. data below a line 121 in FIG. 12), is rotated by 180 degrees (and then shifted down so that it still appears below the line 121 shown in FIG. 12).

FIG. 13 shows a display, indicated generally by the reference numeral 130, by which video and audio data from the system 50 can be provided with one display on top of another as with the display 30 described above with reference to FIG. 3. The display 130 is based on the data 120 described above.

The display 130 includes a first region 131 and a second region 132 that correspond to the first and second views 31 and 32 described above with reference to FIG. 3. The first region 131 includes first and second visual representations (and accompanying spatial audio data) 141 and 142 of the first and second objects 51 and 52 that are within the first region 131. The second region 132 includes and third and fourth visual representations (and accompanying spatial audio data) 143 and 144 of the third and fourth objects 53 and 54 that are visible with the second region 132. The first to fourth visual representations 141 to 144 are based on the representations 111, 112, 113 and 114 respectively described above with reference to FIG. 12.

The data 130 also includes fifth 145 and sixth 146 audio representations corresponding to the spatial audio data from the fifth and sixth objects 55 and 56. The audio from those objects is therefore presented in the data 130 as coming from the left of the displays 131 and 132. Similarly, the data includes seventh 147 and eighth 148 audio representations corresponding to the spatial audio data from the seventh and eighth objects 57 and 58. The audio from those objects is therefore presented in the data 120 as coming from the right of the displays 131 and 132. The fifth to eighth audio representations 145 to 148 are based on the representations 115, 116, 117 and 118 respectively described above with reference to FIG. 12.

Figure 14:
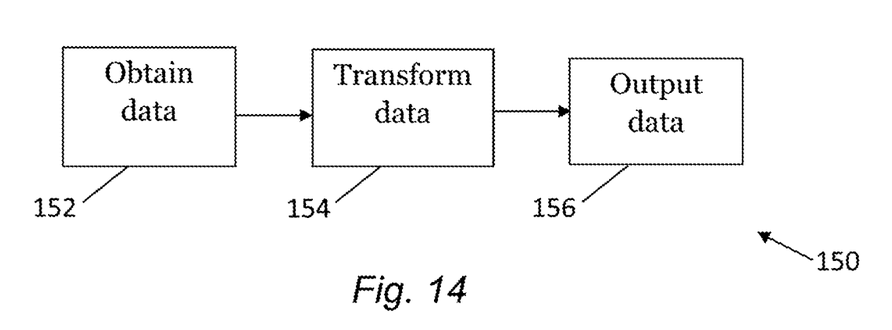
FIG. 14 is a flow chart showing an algorithm in accordance with an example embodiment.

FIG. 14 is a flow chart showing an algorithm, indicated generally by the reference numeral 150, in accordance with an example embodiment.

The algorithm 150 starts at operation 152, where data is obtained. The data obtained in operation 152 includes video data (e.g. obtained from the video cameras 13 and 14 described above) and audio data (e.g. the spatial and ambient audio data described above).

The data obtained in operation 152 is transformed in some way in operation 154 of the algorithm 150. The transformed data is then output in output data operation 156.

Examples of the data transformation operation 154 include the transformations described above with reference to FIGS. 6 to 13.

Figure 15:
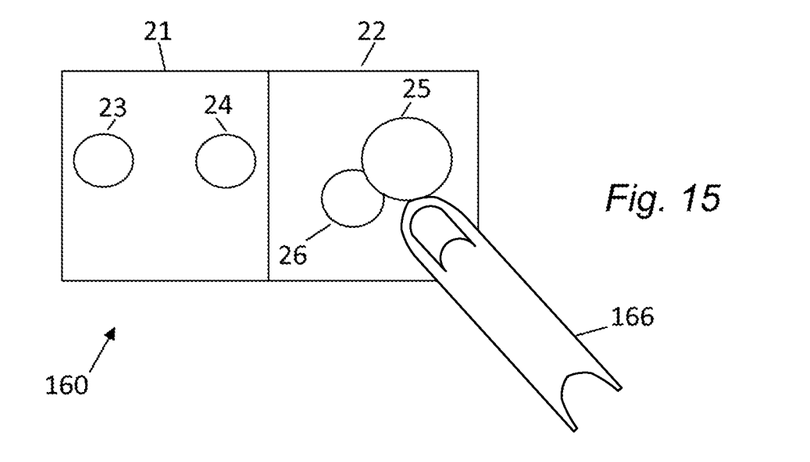
FIG. 15 shows user interaction with a data output in accordance with an example embodiment.

FIG. 15 shows user interaction, indicated generally by the reference numeral 160, in accordance with an example embodiment. The user interaction 160 shows the first view 21 and the second view 22 of the exemplary view 20 described above with reference to FIG. 2.

The user interaction 160 takes the form of a user's finger (indicated by the reference numeral 166) pressing on the second view 22. By holding a finger on the second output view 22, the user can attenuate the audio content from the indicated direction (i.e. the rear direction in the case shown in FIG. 15). Thus, all sounds coming from behind the user device are attenuated.

Of course, many variants to the user interaction 160 are possible. The user could, of course, indicate that the first view (the front view) should be attenuated (by pressing on the first view 21). Alternatively, the user indication could indicate that the indicated region should be boosted (rather than attenuated). Further, it is not necessary for the interaction to be indicated by a user's finger contacting the display. For example, a stylus could be used. Other selection options are also possible, for example voice commands and keyboard or mouse instructions could be used.

The user interaction 160 has been described with reference to the side-by-side display 20. The same principles could, of course, be applied to the display format 30 in which one display is presented on top of the other.

Figure 16:
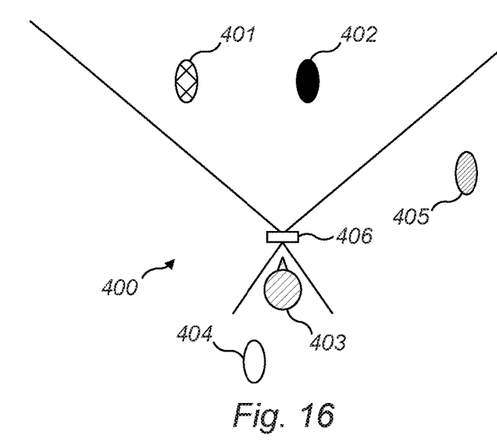
FIG. 16 is a block diagram of a system in accordance with an example embodiment.
Figure 17:
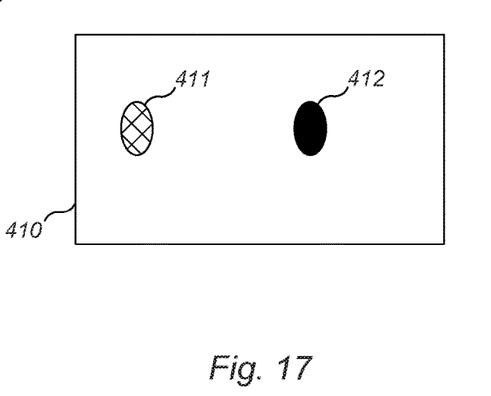
FIG. 17 is an example view output by the system of FIG. 16.
Figure 18:
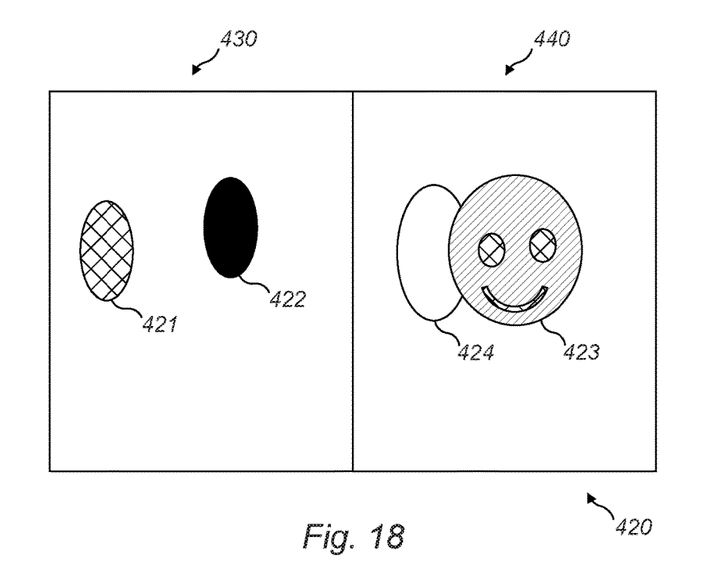
FIG. 18 is an example view output by the system of FIG. 16.

By way of examples, FIGS. 16 to 18 show an example system in which some of the principles described herein are applicable.

FIG. 16 is a block diagram, indicated general by the reference numeral 400, of a system in accordance with the some of the principles described herein. The system comprises a first object 401, a second object 402, a third object 403, a fourth object 404 and a fifth object 405. The first and second objects are within the field of view of a front camera of a user device 406. The third object 403 (which may be an operator of the user device 406) and the fourth object 404 are within the field of view of a rear camera of the user device. The fifth object 405 is outside the fields of view of the cameras.

FIG. 17 is an example view 410 output by the system 400 described above. The view 410 includes a first image 411 and a second image 412, which images are representations of the first object 401 and second object 402 as taken by the front camera of the user device 406 respectively. The third to fifth objects are not visible in the view 410 since they are outside the field of view of the front camera of the user device 406.

Assume that user device records spatial audio, including spatial audio data for the first to fifth objects 401 to 405. Such spatial audio can be recorded using an array of microphones. The spatial audio can be presented together with the view 410 so that the sounds in a recorded scene can be heard as if coming from the direction from which they were recorded.

FIG. 18 is an example view 420 output by the system 400 described above. The view 420 includes a first view 430 and a second view 440 presented side-by-side. The first view 430 includes a first image 421 and a second image 422, which images are representations of the first object 401 and second object 402 as taken by the front camera of the user device 406 respectively. Similarly, the second view 440 includes a third image 423 and a fourth image 424, which images are representations of the third object 403 and the fourth object 404 as taken by the rear camera of the user device 406 respectively.

As described above with reference to FIG. 17, when recording a video with only one camera and spatial audio, the captured video and sound scene are aligned. Thus, if there is a sound producing object in the front-centre of the video, it will be heard as if coming from the same direction during rendering. This is not the case with the view 420. Audio rendered will not match the rendered video. For example, video data from behind the user device 406 is rendered in the front right of the view 420. Audio from, for example, the third and fourth objects 403 and 404 in particular will therefore not match the visual renderings 423 and 424. This can cause confusion to users of the system 400 and may lessen the effect of immersion intended to be provided by the use of spatial audio.

Figure 19:
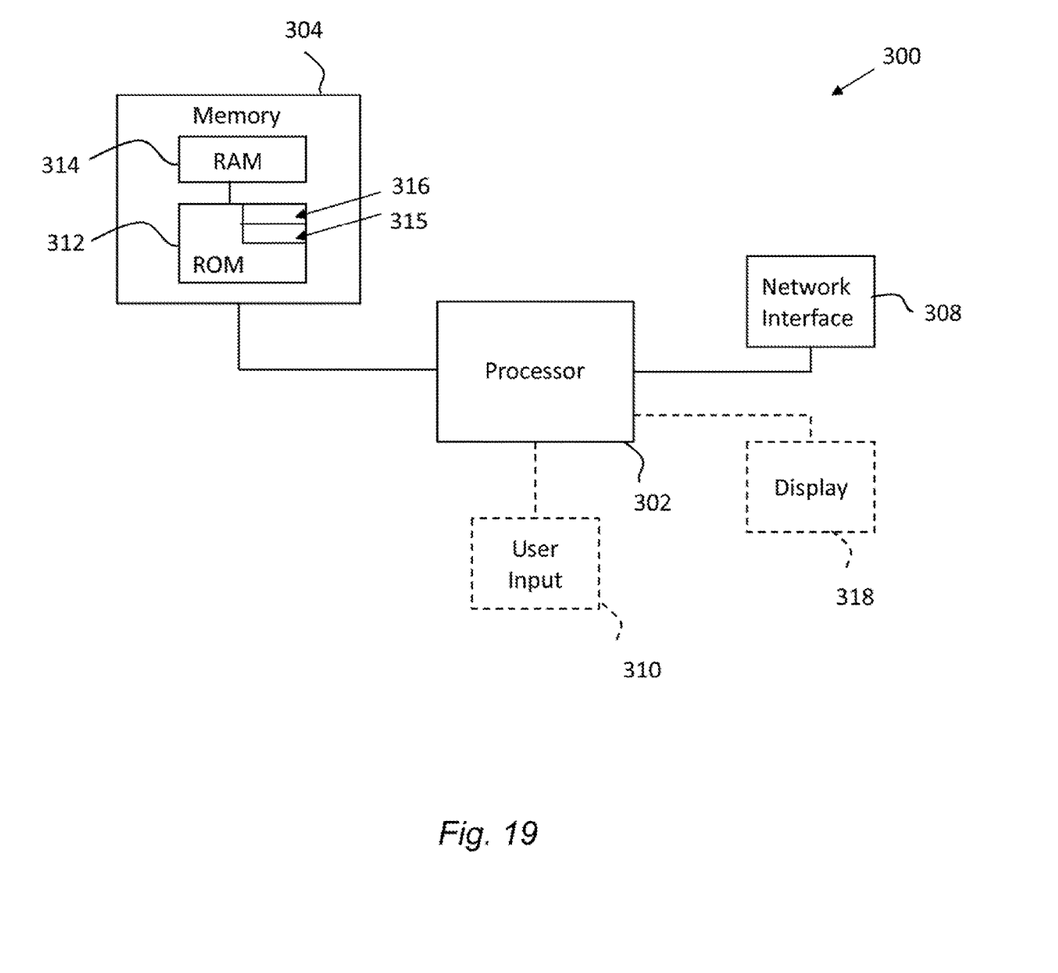
FIG. 19 is a block diagram, of components of a processing system in accordance with an example embodiment.

For completeness, FIG. 19 is an example schematic diagram of components of one or more of the modules described previously, in accordance with an example embodiment, which hereafter are referred to generically as processing systems 300. A processing system 300 may comprise a processor 302, a memory 304 closely coupled to the processor and comprised of a RAM 314 and ROM 312, and, optionally, user input 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithm 150.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there. The communication may be processed through the network interface 308.

Figures 20A, 20B:
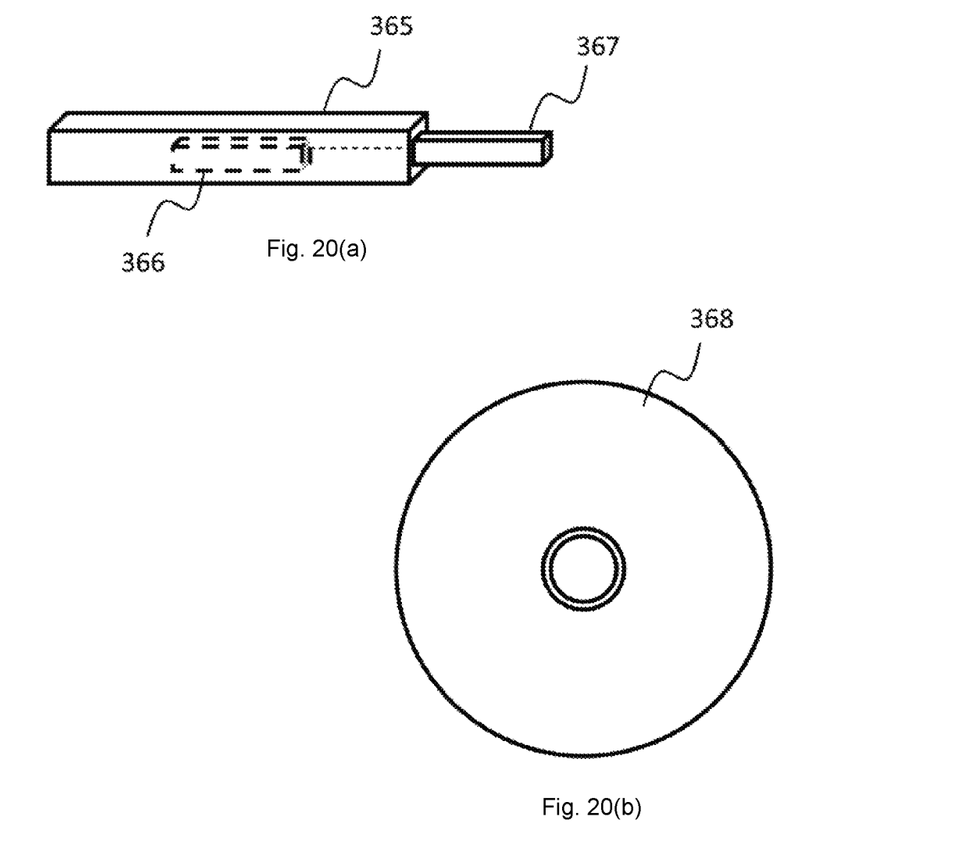
FIGS. 20a and 20b show tangible media, respectively a removable memory unit and a compact disc (CD) storing computer-readable code which when run by a computer perform operations according to embodiments.

FIGS. 20a and 20b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 14 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
at least one processor; and
at least one memory including computer program code;
the at least one memory and the computer program code configured to, with the at least one processor, cause the apparatus at least to perform:
obtaining first video data of a first region using a first camera of a multi-camera device;
obtaining second video data of a second region using a second camera of the multi-camera device, the second camera being orientated in a different direction to the first camera, such that the first and second regions are at least partially different;
generating a multi-camera video output from the first and second video data using a first video mapping to map the first video data to a first portion of the multi-camera video output and using a second video mapping to map the second video data to a second portion of the multi-camera video output;
modifying the first and second video data to implement the first and second video mappings such that the first and second portions of the video output are narrower than the first and second video data;
obtaining audio data using the multi-camera device, at least some of the audio data having a directional component; and
generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

2. The apparatus as claimed in claim 1, wherein the at least one memory and the computer program code are configured such that audio data having a directional component outside both the first and second regions is excluded from the audio output.

3. The apparatus as claimed in claim 1, wherein the at least one memory and the computer program code are configured such that audio data having a directional component outside both the first and second regions is included in the audio output as audio output without a directional component.

4. The apparatus as claimed in claim 1, wherein the at least one memory and the computer program code are configured such that audio data having a directional component outside both the first and second regions is included in the audio output as audio output with a directional component, wherein the audio data having a directional component outside both the first and second regions undergoes a third audio mapping.

5. The apparatus as claimed in claim 4, wherein the at least one memory and the computer program code are configured to, with the at least one processor, cause the apparatus to further perform stretching the audio data having a directional component outside both the first and second regions by the third audio mapping such that the area of the audio output corresponding to the area outside the first and second regions is wider than said area outside said first and second regions.

6. The apparatus as claimed in claim 4, wherein the at least one memory and the computer program code are configured such that the first, second and third audio mappings are such that the audio output provides a 360 degree audio output.

7. The apparatus as claimed in claim 1, wherein the at least one memory and the computer program code are configured such that the first and second portions of the multi-camera output are presented side-by-side.

8. The apparatus as claimed in claim 1, wherein the at least one memory and the computer program code are configured such that the first and second portions of the multi-camera output are presented with one data output on top of the other.

9. The apparatus as claimed in claim 1, wherein the at least one memory and the computer program code are configured such that the obtaining audio data using the multi-camera device comprises using one or more spatial microphones or an array of microphones.

10. The apparatus as claimed in claim 1, wherein the at least one memory and the computer program code are configured to, with the at least one processor, cause the apparatus to further perform obtaining a user indication of whether audio data associated with the first portion or the second portion of the multi-camera video output is to be boosted or attenuated.

11. The apparatus as claimed in claim 10, wherein the at least one memory and the computer program code are configured such that the user indication is performed by a user contacting the first or the second portion of the multi-camera video output respectively.

12. The apparatus as claimed in claim 1, wherein data obtained from the first camera is obtained from a front camera, or the data obtained from the second camera is obtained from a rear camera.

13. A method, comprising:
using a first camera of a multi-camera device to obtain first video data of a first region;
using a second camera of the multi-camera device to obtain second video data of a second region, the second camera being orientated in a different direction to the first camera, such that the first and second regions are at least partially different;
generating a multi-camera video output from the first and second video data using a first video mapping to map the first video data to a first portion of the multi-camera video output and using a second video mapping to map the second video data to a second portion of the multi-camera video output;
modifying the first and second video data such that the first and second portions of the video output are narrower than the first and second video data;
using the multi-camera device to obtain audio data, at least some of the audio data having a directional component; and
generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

14. The method as claimed in claim 13, wherein audio data having a directional component outside both the first and second regions is:
excluded from the audio output;
included in the audio output as audio output without a directional component; or
included in the audio output as audio output with a directional component, wherein the audio data having a directional component outside both the first and second regions undergoes a third audio mapping.

15. The method as claimed in claim 13, wherein the first and second portions of the multi-camera output are presented side-by-side or with one data output on top of the other.

16. The method as claimed in claim 13, further comprising a user indicating whether audio data associated with the first portion or the second portion of the multi-camera video output is to be boosted or attenuated.

17. A non-transitory computer-readable medium having computer-readable code stored thereon, the computer readable code, when executed by at least one processor, causing performance of:
obtaining first video data of a first region using a first camera of a multi-camera device;
obtaining second video data of a second region using a second camera of the multi-camera device, the second camera being orientated in a different direction to the first camera, such that the first and second regions are at least partially different;
generating a multi-camera video output from the first and second video data using a first video mapping to map the first video data to a first portion of the multi-camera video output and using a second video mapping to map the second video data to a second portion of the multi-camera video output;

modifying the first and second video data such that the first and second portions of the video output are narrower than the first and second video data;

obtaining audio data using the multi-camera device, at least some of the audio data having a directional component; and generating an audio output from the obtained audio data, the audio output comprising an audio output having a directional component within the first portion of the video output and an audio output having a directional component within the second portion of the video output, wherein generating the audio output comprises using a first audio mapping to map audio data having a directional component within the first region to the audio output having a directional component within the first portion of the video output and using a second audio mapping to map audio data having a directional component within the second region to the audio output having a directional component within the second portion of the video output, wherein the first and second audio mappings correspond to the first and second video mappings respectively.

* * * * *